United States Patent
Sugimoto et al.

[11] Patent Number: 5,285,721
[45] Date of Patent: Feb. 15, 1994

[54] SLIDE OPERATION CONTROL DEVICE FOR A PRESS

[75] Inventors: Noboru Sugimoto, Koganei; Souichi Kumekawa, Tokorozawa; Masao Mukaidono, Tokyo; Masayoshi Sakai; Koichi Futsuhara, both of Urawa, all of Japan

[73] Assignee: The Nippon Signal Co., Ltd., Tokyo, Japan

[21] Appl. No.: 988,943

[22] Filed: Mar. 10, 1993

[51] Int. Cl.$^5$ .................. B30B 15/26; B30B 15/14; B30B 15/28
[52] U.S. Cl. .................................. 100/43; 100/48; 100/53; 192/129 A
[58] Field of Search .............. 100/43, 48, 53; 72/19, 72/25, 26; 192/129 A, 143

[56] References Cited

U.S. PATENT DOCUMENTS

| | | | |
|---|---|---|---|
| 3,227,255 | 1/1966 | Heiberger | 192/129 A X |
| 3,249,820 | 5/1966 | Stimmel | 192/129 A X |
| 3,534,844 | 10/1970 | Freeland | 192/129 A |
| 3,628,357 | 12/1971 | Luenser | 100/53 X |
| 3,815,456 | 6/1974 | Braathen et al. | 100/53 X |
| 3,889,503 | 6/1975 | Luenser | 100/53 X |
| 4,298,114 | 11/1981 | Nagai et al. | 100/53 X |

FOREIGN PATENT DOCUMENTS

| | | | |
|---|---|---|---|
| 518382 | 7/1976 | U.S.S.R. | 100/53 |
| 654448 | 3/1979 | U.S.S.R. | 100/43 |
| 797910 | 1/1981 | U.S.S.R. | 100/43 |
| 967860 | 10/1982 | U.S.S.R. | 100/43 |
| 1219414 | 3/1986 | U.S.S.R. | 100/43 |

*Primary Examiner*—Stephen F. Gerrity
*Attorney, Agent, or Firm*—Lowe, Price, LeBlanc & Becker

[57] ABSTRACT

The present invention is to provide a fail-safe slide operation control device for a press of simple structure when the electronic circuit by fail-safe signal processing as a circuit for monitoring overrun and confirming the OFF condition of an operation button, which is important function to control the slide, is used instead of a contact circuit composed of relays.

7 Claims, 5 Drawing Sheets

GENERATION OF SIGNAL Ss

Fig. 9

SLIDE OPERATION CONTROL DEVICE FOR A PRESS

TECHNICAL FIELD OF THE INVENTION

The present invention relates to a fail-safe slide operation control device for a press that does not mistakenly generate an output of operation permission of the slide in the case of a failure.

BACKGROUND ART

In an operation system in which an operator and a machine conduct working in cooperation with each other, for example, in an operation system using a press in which a slide reciprocated through a connecting rod by a crank rotated synchronously with a motor, is manually operated by an operator, the safety measure for the operator is very important.

In the aforementioned operation system, it is important to ensure safety by monitoring overrun of the slide by determining operating conditions in the slide operation process on the press side and also by an optical safety device disposed before a bolster.

The safety measures will be logically explained as follows.

A job site S (a region on a bolster in the case of a press) is studied here in which an operator and a movable portion of a machine (a slide in the case of a press) conduct working in cooperation with each other. A logic variable $H(t)$ represents that the operator is present in job site S at time t. A logic variable $M(t)$ represents that the movable portion of the machine exists in job site S at time t. $H(t)=1$ represents that the operator is working in job site S at time t, and $H(t)=0$ represents that the operator is not working in job site S. $M(t)=1$ represents that the movable portion of the machine is operated in job site S at time t, and $M(t)=0$ represents that the machine is not operated.

In this case, consideration is given to a form in which the operator and the movable portion of the machine are existing in job site S, and $Hs(t)$ represents that the operator is in job site S while he is working in a correct operation, and $Ms(t)$ represents that the movable portion of the machine is in job site S while it is being operated in a correct operation. Further, $Hf(t)$ represents that the operator is mistakenly in job site S, and $Mf(t)$ represents that the movable portion of the machine is in job site S due to a breakdown or an influence of noise. ($Hs(t) \cdot Hf(t)=0$, and $Ms(t) \cdot Mf(t)=0$)

Therefore, $Hs(t)=1$ or $Ms(t)=1$ represents that the operator or the movable portion of the machine is rightly working in job site S at time t. $Hf(t)=1$ or $Mf(t)=1$ represents that the operator or the movable portion of the machine is incorrectly working in job site S at time t. $Hs(t)=0$ or $Ms(t)=0$ represents that the operator or the movable portion of the machine is not working in job site S at time t in the form of a correct operation. $Hf(t)=0$ or $Mf(t)=0$ represents that the operator or the movable portion of the machine is not working in job site S at time t in the form of a incorrect operation.

When consideration is given to mistaken operations as described above, the operation of the operator or the movable portion of the machine is either a normal operation or a mistaken operation. Therefore, the working state $H(t)$ of the operator in job site S at time t and the working state $M(t)$ of the movable portion of the machine in job site S at time t can be expressed by the following expressions.

$$H(t) = Hs(t) \vee Hf(t) \tag{1}$$

$$M(t) = Ms(t) \vee Mf(t) \tag{2}$$

where V represents a logical sum.

In the aforementioned operation system, the occurrence of an accident is defined as follows: the operator and the movable portion of the machine operate together at the same time in the same space, that is, a collision occurs. Accordingly, in order to safely carry out the operation in this operation system, the following expression must be satisfied at time t.

$$H(t) \cdot M(t) = 0 \tag{3}$$

where·represents a logical product.

That is, the following expressions must be satisfied.

$$\{Hs(t) \vee Hf(t)\} \cdot \{Ms(t) \vee Mf(t)\} =$$

$$\{Hs(t) \cdot Ms(t)\} \vee \{Hs(t) \cdot Mf(t)\}$$

$$\vee \{Hf(t) \cdot Ms(t)\} \vee \{Hf(t) \cdot Mf(t)\} = 0 \tag{4}$$

The aforementioned expression (4) expresses the principle of a safety operation, that is, the expression (4) means that: in the case where the operator and the movable portion of the machine share job site S with each other, not only when both the operator and the movable portion of the machine operate rightly but also when one of the operator and the movable portion, or both of them operate incorrectly, the occurrence of collision must be prevented.

In the case where the operation system is set so that the aforementioned principle of safety operations can be satisfied, the expression $Hs(t) \cdot Ms(t)=0$ must be satisfied when the operator and the movable portion of the machine are in a normal operating condition. Therefore, in order to ensure the safety of operations even when a mistaken operation is conducted, the following expression must be satisfied.

$$\{Hs(t) \cdot Mf(t)\} \vee \{Hf(t) \cdot Ms(t)\} \vee \{Hf(t) \cdot Mf(t)\} = 0 \tag{5}$$

The above expression is a condition to be satisfied even when an operation is mistakenly carried out.

Expression (5) is satisfied when the operation is carried out in the following manner: even when a mistaken operation that neither the operator nor the movable portion of the machine starts working, is caused, that is, even when a mistaken operation on the side of $Hf(t)=0$ or $Mf(t)=0$ is caused, both mistaken operations of $Hf(t)=1$ and $Mf(t)=1$ are not caused. In other words, expression (5) is satisfied when there are no mistaken operations on the sides of the operator and the movable portion of the machine, that is, expression (5) is satisfied when neither expression $Hf(t)=1$ nor expression $Mf(t)=1$ is satisfied. This means that: when both the operator and the movable portion of the machine are provided with fail-safe properties (properties in which operations are not started mistakenly), that is, when both expression $Hf(t)=0$ and expression $Mf(t)=0$ are satisfied, expression (5) can be satisfied. The aforementioned operation system can be realized by the structure in which an output on the side of the movable portion of the machine is generated when it has been detected that the operator is not present in job site S, and also in which the operation on the side of the operator is started when it has been confirmed that the movable portion of the machine is not in job site S. That is, the aforementioned operation system can be realized by the structure of an interlock system of the operator and the machine. The logical expression to ensure safety is expressed as follows:

$$H(t) = h(t) \cdot \neg M(t)$$

$$M(t) = m(t) \cdot \neg H(t) \tag{6}$$

(Mark $\neg$ expresses a negation in the above expressions.) where the operation command of the movable portion of the machine is m(t), the output to conduct working is M(t), the will of working on the operator's side is h(t), and the behavior to conduct working is H(t), and each of them is expressed by binary logic variables (1 and 0).

Expression (5) is given by the sum of three logical products $Hs(t) \cdot Mf(t)$, $Hf(t) \cdot Ms(t)$ and $Hf(t) \cdot Mf(t)$. Therefore, even when a mistaken operation such as $Hf(t)=1$ or $Mf(t)=1$ occurs, no problem is caused when the sum of the logical products is a logical value 0. For example, when a mistaken operation $Hf(t)=1$ of the operator is caused, no problem is caused when the movable portion of the machine is not operated, that is, no problem is caused as long as neither $Ms(t)=1$ nor $Mf(t)=1$. In the case where a mistaken operation $Mf(t)=1$ of the movable portion of the machine is caused, no problem is caused unless the operator starts working, that is, no problem is caused as long as neither $Hs(t)=1$ nor $Hf(t)=1$. The structure to ensure safety according to expression (6) must be provided with the following function on the side of the movable portion of the machine: the function to detect that the operator is not present in job site: and the function to control the movable portion side so that the movable portion side can not mistakenly generate an output. Also, the structure to ensure safety must be provided with the following function on the side of the operator: the function to check that the movable portion of the machine is not present in the job site; and the function to control the operator so that the operator never goes to the job site. However, it is essentially impossible for the operator to conduct working without making any mistakes in an actual operation. Also, the operation command generated on the side of the movable portion of the machine is not necessarily generated without mistakes. Therefore, in order to realize the operation system in which the operator and the machine conduct working in cooperation with each other, there is no way except for adopting the following system: on the assumption that the worker does not intentionally collide against the movable portion of the machine, the movable portion of the machine conducts working at least only when the operator is not present in the job site; and a countermeasure is taken on the side of the movable portion of the machine so that any mistakes are not made when working is carried out.

Figure 1:
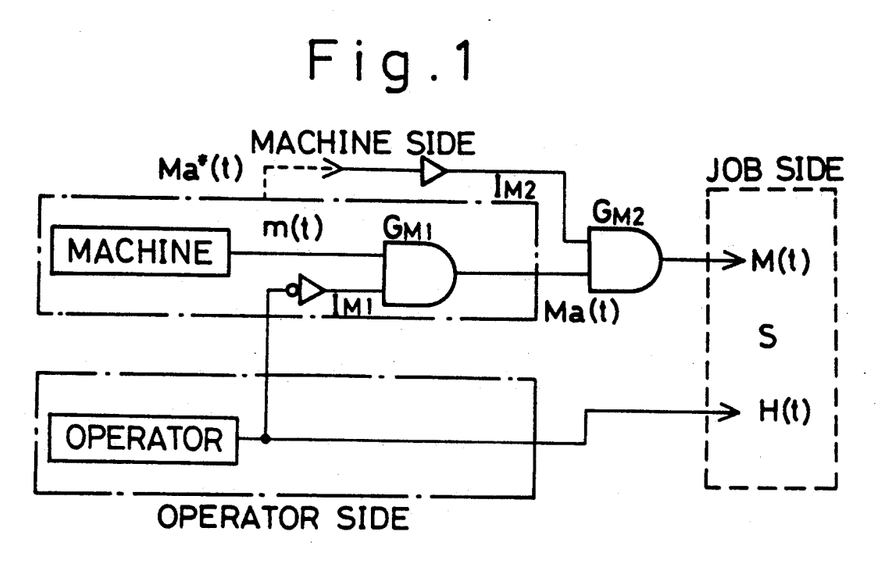
FIG. 1 is a schematic illustration showing the structure of a system for press working in which a machine and an operator work safely.

FIG. 1 is a schematic illustration showing a model of an operation system in which the operation is carried out without relying on the confirmation and judgement of safety made by an operator (for example, the confirmation and judgement of safety based on visibility), wherein it is acknowledged that the operator can not help making a mistake when he confirms and judges the safety of operation.

In FIG. 1, Character S denotes a job site in which the movable portion of the machine and the operator conduct working in cooperation with each other, $I_{M1}$ denotes a sensor detecting that the worker is not present in job site S, $I_{M2}$ denotes a sensor detecting that there is no mistake on the machine side (in the case of a press, on the side of a controller that generates operation command m(t)), and $G_{M1}$ and $G_{M2}$ are logical product components that show the judging function. The operation command m(t) on the machine side is made as follows: after sensor $I_{M1}$ has confirmed that the operator is not present in job site S, output command $Ma(t)=(m(t) \cdot \neg H(t))$ is generated in accordance with the result of the judgment. This output command Ma(t) is made in the following manner: output M(t) to carry out the operation is generated after sensor $I_{M2}$ has confirmed that the machine side is normal so that the output can not be mistakenly sent due to a failure on the machine side while the operator is in a working condition. When sensor $I_{M2}$ and logical product component $G_{M2}$ are realized, being provided with fail-safe output properties in which output M(t) to carry out the operation is not mistakenly generated, output M(t) on the machine side can be expressed by the following expression.

$$M(t) = m(t) \cdot \neg H(t) \cdot Ma^*(t) \tag{7}$$

The meaning of expression (7) is as follows: only when the operator is not present in job site S ($\neg H(t)=1$) and the machine side is normal ($Ma^*(t)=1$), execution output M(t) obeys operation command m(t). $Ma^*(t)$ is a logic variable representing the operating condition on the machine side. It is a binary value that expresses a logical value 1 in the case of a normal operating condition, and a logical value 0 in the case of an abnormal operating condition.

That is, in order to satisfy expression (7) for ensuring the safety of an operation system in a press in which the operator and the machine conduct working in cooperation with each other, it is necessary to provide the function to detect that the operator is not present on the bolster, that is, the confirming function of $\neg H(t)=1$, and also it is necessary to provide the function to detect that the machine is normal, that is, the confirming the function of $Ma^*(t)=1$. In the case of a press, the former function is provided by an optical type safety device structured in such a manner that: a light beam is formed before the bolster; the light beam is intercepted by the body of the operator who is present on the bolster when the slide is lowered; and the lowering motion of the slide is stopped when the light beam is intercepted. The latter function is a fail-safe overrun monitoring function in the sliding operation control that is operated in such a manner that: only when the machine side including sensor $I_{M1}$ and logical product component $G_{M1}$ is normal, the output to lower the slide is generated; and at the same time, the braking function is confirmed so that the slide can be positively stopped at the time when the slide ought to be stopped.

Monitoring of overrun of the slide in the slide operation control in a press is conducted in such a manner that: it is confirmed whether or not the slide is raised and stopped in a predetermined range. However, in general, it is difficult to confirm in a short period of time that a body has been completely stopped in a mechanical system. Therefore, whether or not the slide has overrun in a press is judged in such a manner that: after a stop command has been given to the slide in the process of rising, the slide is restarted; and at that time, the position of the slide is confirmed. For example, in the case of a mechanical press in which the number of strokes is not more than 150 in a minute, the following structure is required: when the slide is stopped in a range of not more than 15° of the crank angle after the crank angle has passed through the top dead point of the slide, it is judged that the slide can be restarted; and when the slide has passed through the crank angle of 15°, it is judged that the slide has overrun, so that the slide can not be restarted.

It is important that the monitoring method of overrun is provided with the following functions.

(1) The drive source of the slide ought to be shut off in a predetermined position in the elevating process of the slide.

(2) The operation button of the slide is turned off when the slide is restarted.

The function of item (1) has the following meaning. Even when a shut-off operation is conducted too early, the slide is stopped in a predetermined range in the case where the brake has been deteriorated and the braking distance has been extended longer than that in a normal condition. In the aforementioned case, there is a possibility that the operation is mistakenly judged to be normal. The aforementioned function of item (1) prevents the misjudgment described above. Concerning the shut-off function, in the case where the shut-off timing is delayed, the overrun of the slide can be positively judged when the brake is deteriorated. Therefore, the mistake on the delay side can be allowed.

The function of item (2) has the following meaning. In the case where the operation button has a problem on the side of ON, the slide is restarted when the slide passes through the top dead point even if the braking performance is deteriorated and the slide is in an over-running condition. In order to take measures to meet the aforementioned situation, the item (2) means that the operating conditions of the press ought to include a checking operation to check that the start button is in an OFF condition in the elevating process of the slide.

Accordingly, in order to conduct working safely using a press, it is necessary to provide a function in which the operation of the slide is carried out at least only when the operator is not present on the bolster. That is, in addition to the optical safety device, it is necessary to provide the function of monitoring overrun (confirmation of the brake performance) in order to prevent the slide from being mistakenly lowered while the operator is present, and it is also necessary to provide the function of confirming that the operation button is turned off. The aforementioned overrun monitoring function (the brake performance checking function) and the operation button OFF checking function must be realized in such a manner that they are made in a fail-safe structure, that is, in a structure in which the slide is not lowered in the case of a failure.

In order to ensure the safety of the operator in the press working in which the operator and the machine cooperate with each other, it is very important to have the overrun monitoring circuit and the operation button OFF checking circuit composed of a failsafe structure in the slide operation control circuit.

Conventionally, a contact circuit provided with an electromagnetic relay is used for the slide operation control device of a press including the aforementioned overrun monitoring circuit and the operation OFF checking circuit. In this case, it is necessary to give consideration to a problem of the contact of the relay in which the point can not be opened, that is, a problem in which the contact is melted and deposited. In order to take measures to solve the aforementioned problem, for example, a sequential interlock structure (a back-check circuit) is conventionally adopted.

It is structured in the following manner: since the position of each relay is in an ON or OFF condition in accordance with the operating position of the slide, other relays adopt the conditions to conduct the successive operation so that each relay can be sequentially operated. Specifically, the sequential interlock structure is composed in such a manner that: the state of a normally closed contact is used for a proof of OFF of the contact; and the proof is taken for the exciting condition of another relay so that each relay is sequentially operated. According to the aforementioned sequential structure, when a specific contact is in a problem in which the contact is in an ON condition, the normally closed contact can not be closed, so that the exciting condition of another relay can not be satisfied. Therefore, the operation is stopped.

However, in the contact circuit in which the aforementioned relay is used, it is necessary to employ the interlock structure for all relays. Therefore, the number of relays, that is, the number of contacts is increased, so that the circuit structure becomes complicated, which is disadvantageous.

Even when the sequential interlock structure is adopted, the operation can not be necessarily stopped in the case where the melting and depositing problem has concurrently occurred in a large number of relays. Consequently, the sequential interlock structure is not sufficient from the viewpoint of reliability.

In view of the aforementioned circumstances, it is a primary object of the present invention to provide a highly reliable slide operation control device of simple structure used for a press, wherein the overrun monitoring circuit and the operation button OFF checking circuit of the slide operation control device are composed of an electronic circuit based on fail-safe signal processing.

DISCLOSURE OF THE INVENTION

The first invention is to provide a control device to operate a slide of a press having a structure in which the slide is driven when an operation button is operated at each reciprocating motion of the slide, the control device comprising an overrun monitoring circuit and an operation button OFF checking circuit, wherein the slide can be driven downward when both the overrun monitoring circuit and the operation button OFF checking circuit generate an operation permission signal, the overrun monitoring circuit including a first self holding circuit and a second self holding circuit in which the output level is not mistaken for logical value 1 in the case of a failure when the output energy condition of the circuit is represented by the binary logical variables of 1 and 0 and also when a high energy condition is represented by logical value 1 and a low energy condition or a no energy condition is represented by logical value 0, wherein the first self holding circuit being structured in such a manner that: an operation button ON signal representing that the operation button is turned on is used for a trigger signal, the operation button ON signal becoming logical value 1 when the operation button is turned on, the operation button ON signal being not mistaken for logical value 1 in the case of a failure; and an output of logical product of a slide stop command signal and an output signal of the second self holding circuit is used for a reset signal, the slide stop command signal which is a signal to stop the slide becoming logical value 0 in a predetermined position in the range of slide elevation, the slide stop command signal being not mistaken for logical value 1 in the case of a failure, further the second self holding circuit being structured in such a manner that: a start button ON signal is used for a trigger signal, the start button ON signal being a signal showing the start of the operation of the press, the output level of the start button ON signal becoming logical value 1 when the start button is turned on, the output level of the start button ON signal being not mistaken for logical value 1 in the case of a failure; and the logical sum of an top dead point stop confirmation signal, a slide elevating process signal and the output signal of the first self holding circuit is used for a reset signal, the top dead point stop confirmation signal being a signal showing that the slide is in a predetermined range close to the top dead point, the output level of the top dead point stop confirmation signal becoming logical value 1 when the slide is in a predetermined range close to the top dead point, the output level of the top dead point stop confirmation signal being not mistaken for logical value 1 in the case of a failure, the slide elevating process signal being a signal showing that the slide is in the process of elevation, the output level of the slide elevating process signal becoming logical value 1 in a range of slide elevation, the output level of the slide elevating process signal being not mistaken for logical value 1 in the case of a failure, further the output signal of the second self holding circuit being made to be an operation permission signal based on overrun monitoring, wherein the operation is permitted when the output level of the signal is logical value 1.

According to the aforementioned structure, the slide is stopped in a predetermined range of the top dead point if the press is in a normal condition. Therefore, the starting button ON signal is used for a trigger, and the output of the second self holding circuit becomes logical value 1 and is fed back to the trigger input, so that the output is held by itself. As a result of the foregoing, the operation button ON signal is used for a trigger, and the output of the first self holding circuit becomes logical value 1 and is fed back to the trigger input, so that the output is held by itself. The aforementioned self holding output is maintained until the output is reset by the generation of the top dead point stop confirmation signal generated in a predetermined position in the range of slide elevation. When this self holding output is reset, the slide is in the process of elevation, so that the slide elevating process signal becomes logical value 1. Further, when the brake ability is in a normal condition and the slide is stopped in a predetermined range of the top dead point, the top dead point stop signal becomes logical value 1. Therefore, the output of the second self holding circuit generates an operation permission signal of logical value 1 as long as the slide does not overrun.

On the other hand, in the case where the slide has overrun and stopped at a position exceeding a predetermined range, the output levels of the top dead point stop signal, the first self holding circuit signal and the slide elevating process signal become logical value 0. Therefore, the output level of the second self holding circuit becomes logical value 0, and the output of operation permission is not generated.

As described above, the condition in which the overrun is not caused and the press is in a normal operation, is expressed by logical value 1 corresponding to a high energy condition, and only when the output of logical value 1 is generated, the operation permission is given. Accordingly, the signal of operation permission of logical value 1 is not generated in the case of a failure, so that the operation safety can be ensured. Also, the structure of the overrun monitoring circuit can be simplified as compared with a contact circuit in which a relay are used.

The second invention is to provide an operation control device of a slide of a press comprising: an operation button OFF confirmation circuit including a third self holding circuit in which the output level is not mistaken for logical value 1 in the case of a failure when the output energy condition of the circuit is represented by the binary logical variables of 1 and 0, and when a high energy condition is logical value 1 and a low energy condition or a condition without energy is logical value 0, wherein the third self holding circuit is structured in such a manner that: an operation button OFF signal is used for the trigger signal, the operation button OFF signal being a signal showing that the operation button has been turned off, the operation button OFF signal becoming logical value 1 when the operation button has been turned off, the operation button OFF signal being not mistaken for logical value 1 in the case of a failure; and the output of logical product of an operation permission signal of the overrun monitoring circuit, restart prevention signal and a start button OFF signal is used for the reset signal, the restart prevention signal being and a signal for confirming OFF of the operation button, the output level of the restart prevention signal being logical value 0 at a predetermined position in a range of slide elevation, the output level of the restart prevention signal being not mistaken for logical value 1 in the case of a failure, the start button OFF signal being a signal showing that the start button to be operated in the start operation of the press is turned off, the output level of the start button OFF signal being logical value 1 when the start button has been turned off, the output level of the start button OFF signal being not mistaken for logical value 1 in the case of a failure, wherein the output signal of the third self holding circuit is made to be an operation permission signal based on the operation button OFF confirmation, and the operation is permitted when the output level is logical value 1.

In the aforementioned structure, when the press is in a normal operation after the start of the press, the start button is in an OFF condition, so that an operation permission signal of logical value 1 is generated from the overrun monitoring circuit, and a restart prevention signal has already been generated so that it is in an ON condition. Therefore, the third self holding circuit is triggered by the operation OFF signal, so that the operation permission signal of logical value 1 is generated. The, the output of the third self holding circuit is reset by the reset prevention signal at each reciprocating motion of the slide, and unless the operation button is turned off, the output of the third self holding circuit is stopped after that, and the operation permission signal is not generated. Consequently, the OFF condition of the operation button can be confirmed at each reciprocating motion.

When the OFF condition of the operation button is confirmed at each reciprocating motion as described above, the slide can be prevented from being mistakenly lowered. In accordance with the result of the confirmation, the operation permission signal is generated under the condition of logical value 1 that corresponds to a high energy condition. Accordingly, the operation permission signal is not generated in the case of a failure, so that the operation safety can be ensured. In this case, the structure of the operation button OFF confirmation circuit can be simplified as compared with a contact circuit in which relays are used.

According to the third invention, both the overrun monitoring circuit and the operation button OFF confirmation circuit include a fail-safe self holding circuit described above. Therefore, the safety of the operation control device of a slide of a press can be improved and the circuit can be simplified.

MOST PREFERRED EMBODIMENT OF THE INVENTION

With reference to the attached drawings, an example of the present invention will be explained in detail as follows.

Figure 2:
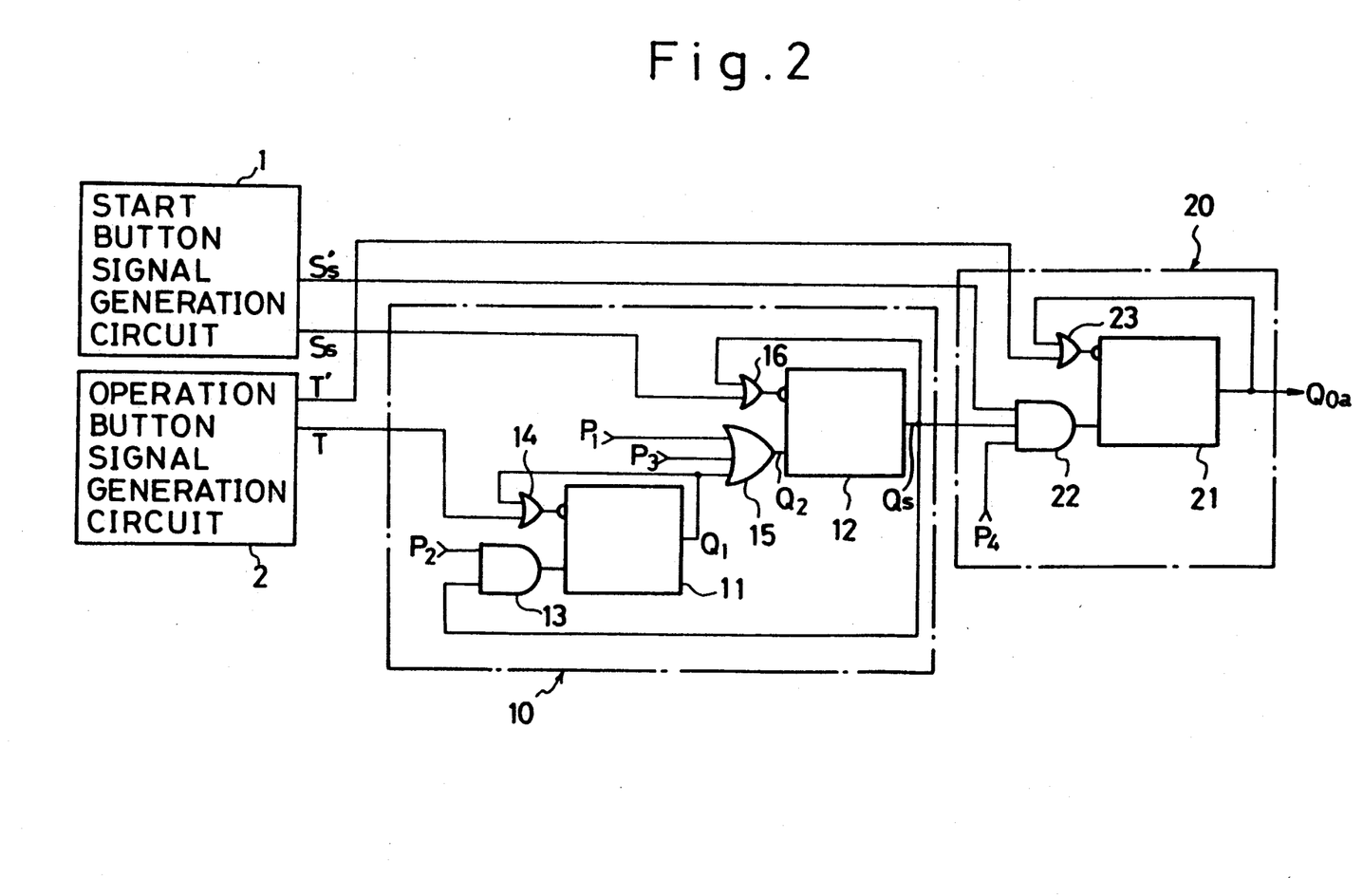
FIG. 2 is a circuit diagram showing an example of the overrun monitoring circuit and the operation button OFF confirmation circuit in the operation control device for a slide according to the present invention.

Output energy conditions of the circuits and signals shown in FIG. 2 are represented by binary variables of logical values 1 and 0, wherein a high energy condition is represented by logical value 1 and a low energy condition or a condition without energy is represented by logical value 0.

When the start button is operated to start the operation of a press, the start button signal generation circuit 1 generates start button ON signal $S_s$ that is generated when the start button is turned on and the output level of which is logical value 1, and also generates start button OFF signal $S_s'$ that is generated when the start button is turned off and the output level of which is logical value 1. The aforementioned start button ON signal $S_s$ and start button OFF signal $S_s'$ are a pair of signals and their logical values do not become 1 at the same time. Under the condition that the start button is operated so that the press can be operated, the operation button signal generation circuit 2 generates operation button ON signal T for driving a slide, for example, operation button ON signal T is generated at each period of the motion of the slide when the operation button is manually operated, and the operation button signal generation circuit 2 further generates operation button OFF signal T' that is generated when the operation button is turned off and the output level of which becomes logical value 1. The aforementioned operation button ON signal T and operation button OFF signal T' are a pair of signals and their logical values do not become 1 at the same time.

Figure 3:
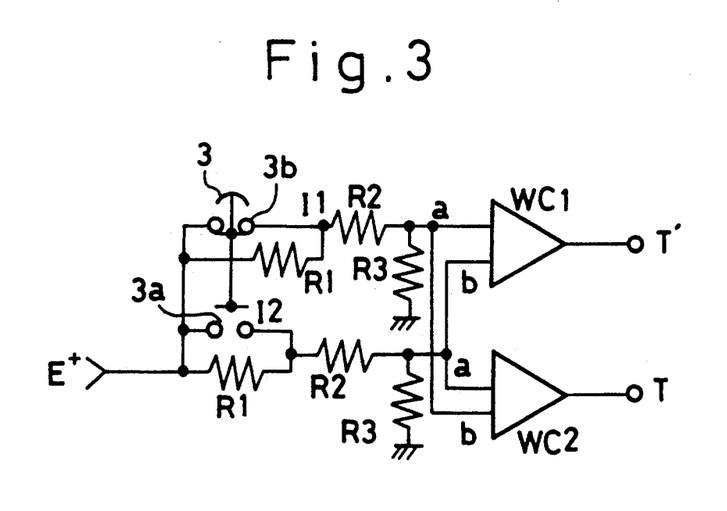
FIG. 3 is a circuit diagram showing an example of the operation button signal generation circuit of the aforementioned example.

FIG. 3 shows a specific example showing the structure of the operation button signal generation circuit 2. In this case, the start button signal generation circuit 1 is the same as the operation button signal generation circuit 2 except that the operation button is replaced with the start button in FIG. 3. Therefore, the start button signal generation circuit 1 is omitted here.

In FIG. 3, the operation button 3 includes the ON contact $3a$ in which the contact point is closed when the operation button 3 is turned on, and the OFF contact $3b$ in which the contact point is closed when the contact is returned by the force of a spring after the operator has released the button. Both contacts $3a$ and $3b$ are connected with an electrical power source (electrical power source E) in parallel with each other. Resistance R1 is connected in parallel with each of the contacts $3a$ and $3b$. Resistance R2 and R3 are connected in series between each of the contacts $3a$, $3b$ and the ground. One input terminal "a" of window comparator WC1 for generating an operation button OFF signal is connected between resistances R2 and R3 on the side of OFF contact $3b$, and the other input terminal "b" is connected between resistance R2 and R3 on the side of ON contact $3a$. One input terminal "a" of window comparator WC2 for generating an operation button ON signal is connected between resistances R2 and R3 on the side of ON contact $3a$, and the other input terminal "b" is connected between resistances R2 and R3 on the side of OFF contact $3b$.

Next, the structures of the overrun monitoring circuit 10 and the operation button OFF confirmation circuit 20 will be explained as follows.

The overrun monitoring circuit 10 includes the first self holding circuit 11 and the second self holding circuit 12 that are structured to be fail-safe so that their output levels can not be mistaken for logical value 1 in the case of a failure.

The first self holding circuit 11 is composed in the following manner:

Operation button ON signal T sent from the operation button signal generation circuit 2 is used for a trigger signal of the first self holding circuit 11 and inputted into one of the input terminals. The logical product output (the output of AND gate 13) of top dead point stop signal $P_2$ that is a slide stop command signal, and output signal $Q_s$ that is an output signal of the second self holding circuit 12, is used for a reset signal and inputted into the other input terminal, wherein top dead point stop signal $P_2$ is a signal to stop the slide and the output level of which becomes logical value 0 at a predetermined position in a range of slide elevation (for example, at a position where the crank angle is 300° in one period of the slide motion) and the output level is not mistaken for logical value 1 in the case of a failure, and wherein output signal $Q_s$ is the final output signal of the overrun monitoring circuit 10. When output $Q_1$ is fed back to the input side of the trigger signal through OR gate 14, the first self holding circuit 11 is composed so that it can be self-held.

Also, the second self holding circuit 12 is composed in the following manner:

Start button ON signal $S_s$ sent from the start button signal generation circuit 1 is used for a trigger signal of the second self holding circuit 12 and inputted into one input terminal. The output of the logical sum (output $Q_2$ of the OR gate 15, which becomes an overrun monitoring signal) of top dead point stop confirmation signal $P_1$, slide elevating process signal $P_3$ and output signal $Q_1$ of the first self holding circuit 11, is used for a reset signal and input to the other input terminal, wherein top dead point stop confirmation signal $P_1$ is a signal showing that the slide is in a predetermined range close to the top dead point (for example, in a range in which the crank angle is from 340° to 15° after the top dead point) and the output level of top dead point stop confirmation signal $P_1$ becomes logical value 1 when the slide is in the aforementioned range including the top dead point (crank angle 0°) and it is not mistaken for logical value 1 in the case of a failure, and wherein slide elevating process signal $P_3$ is a signal showing that the slide is in an elevating process and the output level of which becomes logical value 1 in a predetermined range of slide elevation (for example, in a range of crank angle from 180° to 350°) and the output level is not mistaken for logical value 1 in the case of a failure. When output $Q_s$ is fed back to the input side of the trigger signal through OR gate 16, the second self holding circuit 12 is composed so that it can be self-held. In the case where the slide does not overrun and stops in a normal range and the brake capacity is in a normal condition, output signal $Q_s$ of the second self holding circuit 12 is held at logical value 1 when the output level of overrun monitoring signal $Q_2$ is held at logical value 1, and the operation permission signal is generated to give permission to operate the slide.

The operation button OFF confirmation circuit 20 includes the third self holding circuit 21 composed to be fail-safe so that the output level is not mistaken for logical value 1 in the case of a failure.

The third self holding circuit 21 is composed in the following manner:

Operation button OFF signal T' sent from the operation button signal generation circuit 2 is inputted into one input terminal of the self holding circuit 21 so as to be used for a trigger signal. The output of logical product (the output of the AND gate 22) of final output signal $Q_s$ of the overrun monitoring circuit 10, restart prevention signal $P_4$ that is a signal for confirming the OFF condition of the operation button and the output level of which becomes logical value 0 at a predetermined position in a slide elevating range (for example, at a position of crank angle 240°) and the output level is not mistaken for logical value 1 in the case of a failure, and start button OFF signal $S_s'$ sent from the start button signal generation circuit 1, is used for a reset signal and inputted into the other input terminal. When its output $Q_{0a}$ is fed back to the side of the trigger signal input through the OR gate 23, the third self holding circuit 21 can be self-held. Output $Q_{0a}$ becomes an operation permission signal that gives permission to operate the slide in accordance with the confirmation of OFF of the operation button on the assumption that the operation button is turned off when the output level is logical value 1. Also, output $Q_{0a}$, which is an output of logical product of the operation permission signal of the overrun monitoring circuit 10, becomes an operation preparation signal finally informing that the press is in a normal condition.

Next, with reference to a specific example, the first, second and third self holding circuits 11, 12 and 21 shown in FIGS. 2 and 3, and window comparators WC1 and WC2 will be explained as follows, wherein the first, second and third self holding circuits 11, 12 and 21 are structured to be fail-safe so that the output signal is not generated in the case of a failure, that is, the output level does not become logical value 1 in the case of a failure.

Figure 4:
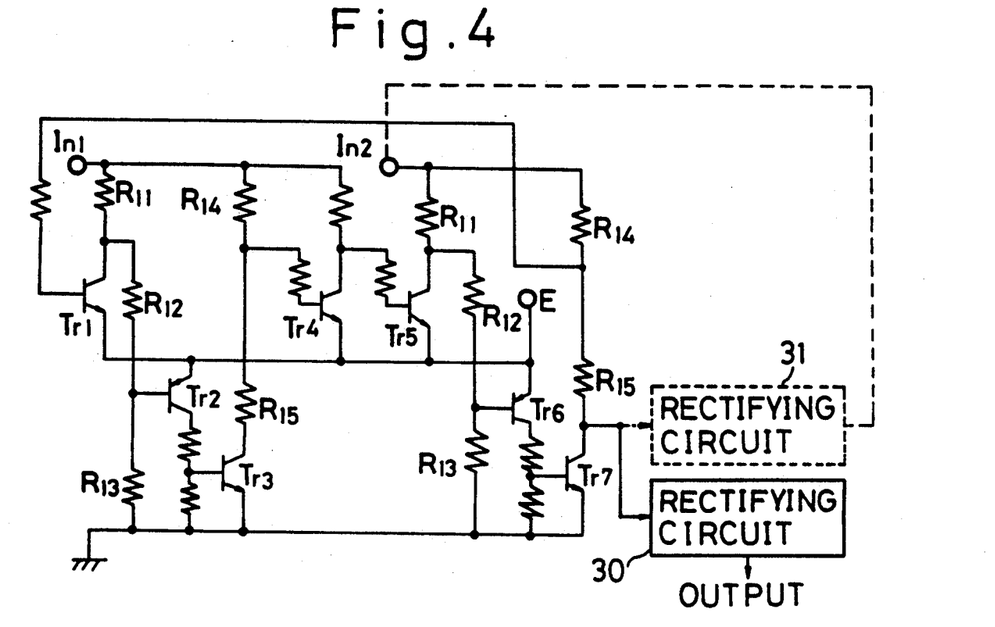
FIG. 4 is an arithmetic and logic circuit diagram applied to a fail-safe self holding circuit and a window comparator.

For example, a fail-safe and circuit disclosed in Japanese Unexamined Patent Publication No. 60-68719 can be applied to each of the aforementioned circuits, and one example is shown in FIG. 4, which will be explained as follows.

FIG. 4 shows an example of the 2-input AND circuit.

In the drawing, R11 to R15 are resistances, $T_{R1}$ to $T_{R7}$ are transistors, E is a voltage of the electric power source of the circuit, $I_{n1}$ and $I_{n2}$ are input terminals, and numeral 30 is a rectifying circuit. In this case, transistor $T_{R2}$ and $T_{r6}$ are of a PNP type, and other transistors of an NPN type.

Next, the operation of the circuit will be briefly explained. When an input voltage is not impressed upon input terminals $I_{n1}$ and $I_{n2}$, transistors $T_{r2}$ and $T_{r6}$ are in an ON condition. When a predetermined input voltage is impressed upon input terminals $I_{n1}$ and $I_{n2}$, transistor $T_{r1}$ to $T_{r7}$ are successively turned on and off as follows: $T_{r2}$ OFF→$T_{r3}$ OFF→$T_{r4}$ ON→$T_{r5}$ OFF→$T_{r6}$ OFF→$T_{r7}$ OFF→$T_{r1}$ ON→$T_{r2}$ ON→$T_{r3}$ ON→$T_{r4}$ OFF→$T_{r5}$ ON→$T_{r6}$ ON→$T_{r7}$ ON→$T_{r1}$ OFF→ . . . .
When the transistors are operated in the aforementioned manner, oscillation is generated. Output of this oscillation is sent out in the form of a DC output through the rectifying circuit 30. In this case, the oscillating condition of this circuit is as follows:

Both input voltages V1 and V2 satisfied the following expression:

$$(E) < (R11 + R12 + R13)E/R13 < V1 = V2 < (R14 + R15)E/R15 \qquad (8)$$

where the input voltages of input terminals $I_{n1}$ and $I_{n2}$ are V1 and V2. It can be known from the above expression that the AND function is provided. This arithmetic circuit is characterized in that: output is not generated when breaking of wire is caused in either of resistance R11 to R15 and also when failure is caused in either of transistors $T_{r1}$ to $T_{r7}$. That is, this arithmetic circuit is provided with the following fail-safe characteristics: when no signals are inputted into the two input terminals, DC output is not generated; and when one of the two input terminals is supplied with an input signal, output is not generated.

When another rectifying circuit 31 is provided as shown by a broken line in the drawing and the rectified output is fed back to one of the input terminals (for example, $I_{n2}$), the first, second and third fail-safe self holding circuits can be formed in which the input signal given to input terminal $I_{n2}$ to which the rectified output is fed back, is used for a trigger signal, and the input signal given to terminal $I_{n1}$ to which the rectified output is not fed back, is used for a reset signal.

Window comparators WC1 and WC2 are structured in such a manner that: resistances R11 to R15 with respect to each terminal are nonsymmetrically provided in the drawing, so that the input threshold values of input terminals $I_{n1}$ and $I_{n2}$ are different.

That is, the output characteristics of window comparators WC1 and WC2 are structured so that the output level can become logical value 1 when an input current in the range $Ia$ (shown in FIG. 5) is inputted into input terminal $I_{n1}$ (corresponding to input terminal "a" in FIG. 3) and also when an input current in the range $Ib<(Ia)$ (shown in FIG. 5) is inputted into input terminal $I_{n2}$ (corresponding to input terminal "b" in FIG. 2).

Figure 5:
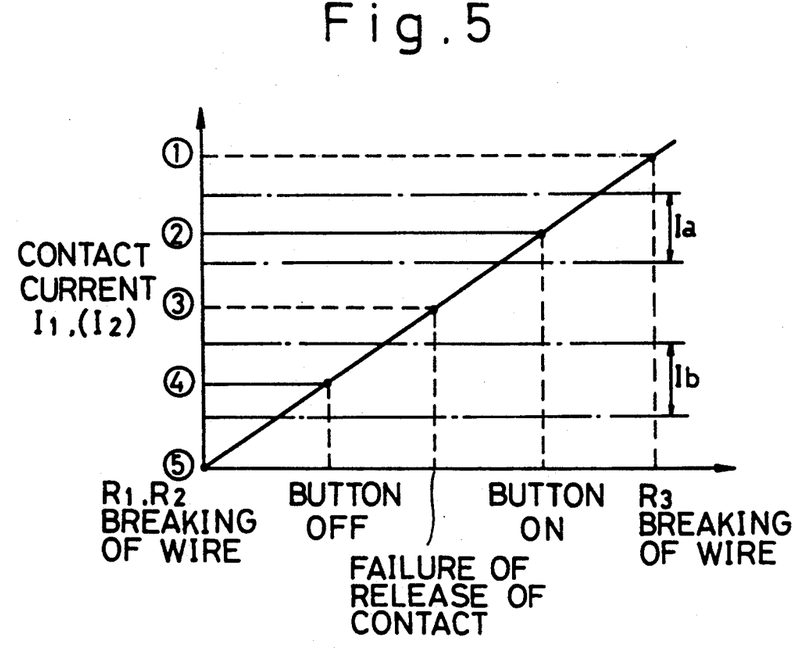
FIG. 5 is an input characteristic diagram of the window comparator of the operation button signal generation circuit shown in FIG. 3.

FIG. 5 shows an operating condition of the operation button, and circumstances of contact point currents I1 and I2 in the case where a failure has caused in the circuit.

When the operation button 3 is turned on, OFF contact 3b is opened, and ON contact 3a is closed, so that contact current I1 on the side of the OFF contact is in a condition of ④, and contact current I2 on the side of the ON contact is in a condition of ②. As a result of the foregoing, no output is generated by window comparator WC1 (logical value 0), and an output of logical value 1 is generated by window comparator WC2, so that operation button ON signal T is generated. When the operation button 3 has been released to be OFF, OFF contact 3b is closed, and ON contact 3a is opened. Therefore, contact current I1 is made to be in condition ②, and contact current I2 is made to be in condition ④. As a result of the foregoing, an output of logical value 1 is generated by window comparator WC1, so that operation button OFF signal T' is generated. However, no output is generated by window comparator WC2 (logical value 0). In the case where breakage of wire has occurred on resistances R1 and R2, and breakage of wire or contact failure in the contacts has occurred on resistance R3 in this circuit, or in the case where imperfect contact has occurred in the contacts, the values of contact currents $I_1$ and $I_2$ exceed the input range of both window comparators WC1 and WC2 as shown by ①, ③ and ⑤ in FIG. 5. Therefore, neither window comparator WC1 nor window comparator WC2 generates an output.

Signals used for the overrun monitoring circuit 10 and the operation OFF confirmation circuit 20 in this example will be explained here.

Figure 6:
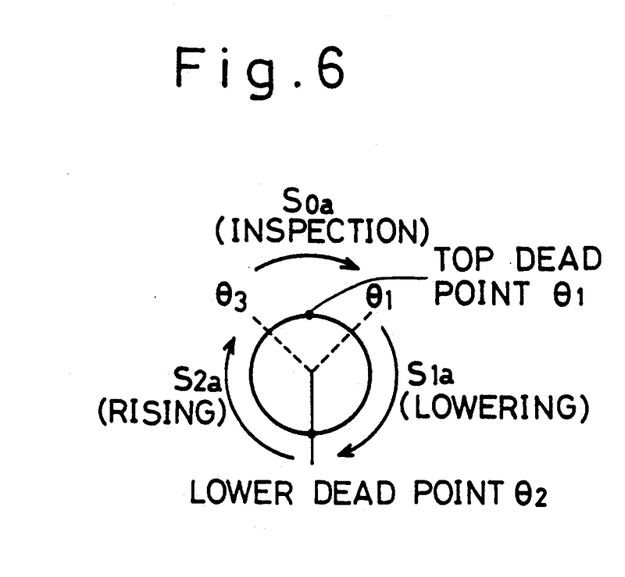
FIG. 6 is a view showing a control sequence of slide operation of a press, wherein the control sequence is expressed by crank angles.

A control sequence in the case of a manual operation of a press can be expressed by crank angles as shown in FIG. 6. (In this example, it is a safety process operation, that is, the operation button is kept being pressed in the lowering process of the slide, and then the operation button is turned off. Then, the slide is immediately stopped.) In the drawing, the top dead point is defined as a point in which the slide is elevated to the highest position (the crank angle: 0°), and the bottom dead point is defined as a point in which the slide is lowered to the lowest position (the crank angle: 180°). In the drawing, the range between crank angle $\theta1$ and $\theta2$ is a slide lowering range S1a, the range between crank angle $\theta2$ and $\theta3$ is a slide elevating range S2a, and the range between crank angle $\theta3$ and $\theta1$ is a range in which a slide lowering operation is started and then a preparation work for the successive process is conducted (monitoring of overrun, and confirmation of OFF of the operation button) and further the slide lowering operation is restarted. In this case, this range is defined as operation preparation range S0a.

In order to ensure the safety of operation, different control operations are carried out in these three ranges. In the slide lowering range S1a, the slide ought to be stopped when the operator is present on the bolster. In the slide elevating range S2a, the slide is automatically elevated, so that the crank must not be rotated reversely. In the operation preparation range S0a, the slide is restarted in accordance with the results of the monitor of overrun and the inspection to check the operation button OFF confirmation. In order to conduct the aforementioned control operations in the three ranges, at least the following four signals are required for expressing the slide position.

That is, the four signals are described as follows: signal $P_1$ to confirm the slide has been stopped at a position close to the top dead point (the crank angle is not more than $\theta1$); signal $P_2$ to shut off the supply of power to drive the slide so as to check the stop function of the slide (the brake ability of the slide); signal $P_3$ to show whether the slide is in a lowering process or in an elevating process: and signal $P_4$ to confirm that the operation button has been turned off.

These four signals are referred to as follows: $P_1$ is a top dead point stop confirmation signal: $P_2$ is a top dead point stop signal: $P_3$ is a slide elevating process signal: and $P_4$ is a restart prevention signal.

Conditions to transfer the slide in 3 ranges are as follows: when the result of inspection in range S0a is good, the slide is lowered and transferred to lowering range S1a; if the system is normal in this lowering process, the slide is automatically elevated and transferred to elevating range S2a; and the present inspection result is reset in elevating range S2a, and the slide is transferred to operation preparation range S0a. In FIG. 6, S0a, S1a and S2a represent the condition of each range with a binary logical variable. When the condition is satisfied in each range, the logical value becomes 1, and the slide is transferred.

Signal processing necessary for forming the slide operation control device of this example into a fail-safe device will be described as follows.

Figure 7:
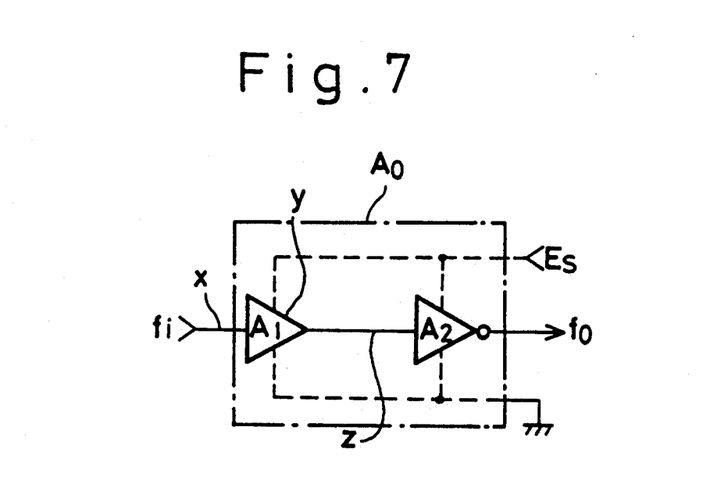
FIG. 7 is a schematic illustration to logically explain the signal processing conducted in a fail-safe manner.

FIG. 7 shows a processing circuit $A_0$ that processes binary input signal $f_i$ so as to generate binary output signal $f_0$. Output $f_0$ is generated only when power is supplied from power source $E_s$. Therefore, output $f_0$ is expressed by either of the following two expressions:

$$f_0 = E_s f_i \qquad (9)$$

or $$f_0 = E_s \neg f_i \qquad (10)$$

In this case, power source $E_s$ is expressed by a binary logical variable in the following manner: when power is inputted, the logical value is 1; and when the power is not inputted, the logical value is 0. If there is no mistake in input $f_i$ and there is no failure in processing circuit $A_0$, $f_0=1$ is generated only when the power is normally inputted ($E_s=1$), and $f_0=0$ includes a mistake ($f_0=0$) on the side of logical value 0 that is caused by a failure on the power source side ($E_s=0$). Therefore, $f_0=1$ does not include a mistake. According to this logical relation of output $f_0$ with respect to power source $E_s$, if it is necessarily mistaken to be $f_0=0$ in the case of a failure of processing circuit $A_0$, $f_0=1$ does not include a mistake with respect to processing circuit $A_0$ in the same manner as power source Es. When there is no mistake in input signal $f_i$, output signal $f_0$ including the operating condition of the processing circuit corresponding to expressions (9) and (10) can be expressed as follows:

$$f_0 = E_s \cdot f_i \cdot A^*0 \quad (11)$$

or $$f_0 = E_s \cdot \neg f_i \cdot A^*0 \quad (12)$$

where $A^*0$ is a binary logical variable representing the operating condition of processing circuit $A_0$, and $A^*0=1$ is a normal condition, and $A^*0=0$ is a failure condition. Expressions (11) and (12) express that: only when processing circuit $A_0$ is normal ($A^*0=1$), $f_0=E_s \cdot f_i$ or $f_0=E_s \cdot \neg f_i$ is generated; and in the case of failure ($A^*0=0$), it is necessarily to be $f_0=0$.

Next, the conditions will be shown as follows in which processing circuit $A_0$ generates $f_0=0$ in the case of a failure. When processing circuit $A_0$ is a NOT circuit in FIG. 7, that is, when processing circuit $A_0$ is an arithmetic circuit of expression (12), in the case where a problem of breaking of wire has occurred in input wire x, a mistake of $f_0=0$ occurs, that is, it is to be $f_i=0$ substantially (that is, $\neg f_i=1$) although $f_i=1$ (that is, $\neg f_i=0$). Therefore, the mistake can not be limited to be $f_0=0$. The aforementioned matter can be made further clear in the case where processing circuit $A_0$ is divided into two circuits of A1 and A2 as shown by a dotted line in FIG. 7 and circuit A2 is a NOT circuit. In this case, even when breaking of wire has occurred in either of wire x, wire y or wire z, a mistake of $f_0=1$ is caused. That is, in the case of fail-safe signal processing, processing circuit $A_0$ should not include a NOT operation, and processing should be carried out in accordance with expression (11).

It is not allowed in fail safe signal processing that processing is mistaken on the side of a signal showing the safety. Therefore, output signal $f_0=1$ is expressed by a logical level in a high energy condition as a signal showing the safety ($f_0=0$ is not safe), and input signal $f_i=1$ must be inputted on a logical level in a high energy condition as a signal showing the safety ($f_i=0$ is not safe).

As a result of the foregoing, in this example, the aforementioned signals $P_1$ to $P_4$ are made to be binary signals, and in order to provide a fail-safe structure from the viewpoint of function of the press, the safety side (corresponding to logical value 1) is defined as follows. However, the positions in which signals $P_1$ to $P_4$ are generated are not changed here.

$P_1$: $P_1$ is a signal for providing a reference to conduct inspection to check the ability of the brake. Accordingly, the generation of $P_1$ means that inspection can be conducted, and the non-generation of $P_1$ means that inspection can not be conducted. Therefore, $P_1$ is generated under the condition of logical value 1.

$P_2$: $P_2$ is a command of slide deceleration, and at the same time $P_2$ means the start of inspection at a position close to the top dead point. The generation of $P_2$ means the stop of operation of the slide. Therefore, $P_2$ is generated under the condition of logical value 0.

$P_3$: $P_3$ means that the slide is in the process of elevation. While the slide is being elevated, it is safe, and while the slide is being lowered, it is dangerous. Accordingly, while the slide is being elevated, the logical value is set at 1, and while the slide is being lowered, the logical value is set at 0.

$P_4$: $P_4$ is a signal that does not allow the operation button to be turned on. Therefore, $P_4$ is generated under the condition of logical value 0. When $P_4=1$, the operation button is allowed to be turned on.

Figure 8:
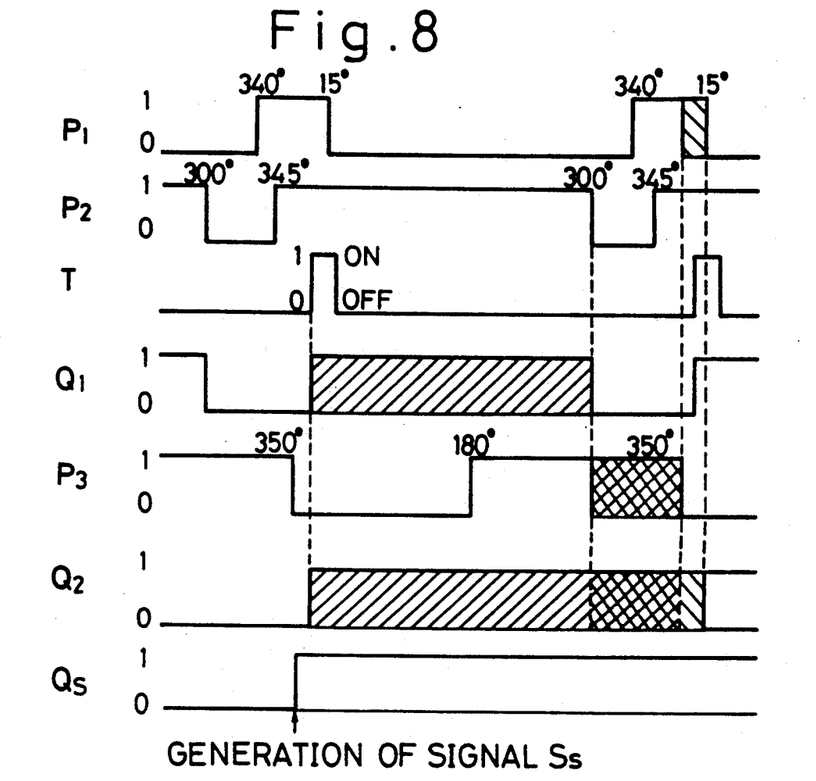
FIG. 8 is a time chart to explain the operation of the overrun monitoring circuit of the aforementioned example.
Figure 9:
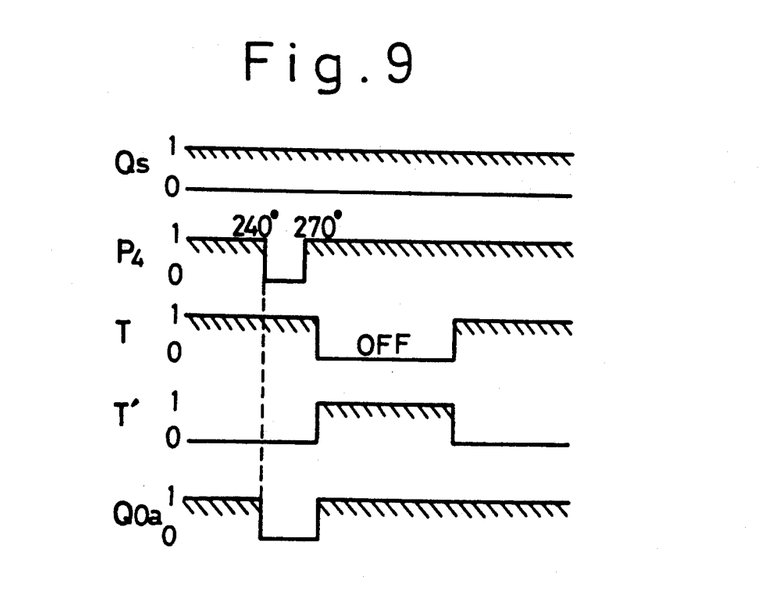
FIG. 9 is a time chart to explain the operation of the operation OFF confirmation circuit of the aforementioned example.

With reference to the time charts shown in FIGS. 8 and 9, the operations of the fail-safe overrun monitoring circuit 10 and the fail-safe operation button OFF confirmation circuit 20 of this example in which the aforementioned signals are used, will be explained as follows.

First, with reference to FIG. 8, the operation of the overrun monitoring circuit 10 will be explained.

When the start button is turned on, the press is set in a condition in which the press can be operated. When the start button is turned on, start button ON signal $S_s$ is generated by the start button signal generation circuit 1, and the output of the OR circuit 16 becomes logical value 1 and is inputted into the second self holding circuit 12. As long as the press is in a normal condition, the slide is stopped in a predetermined range from 340° to 15° (there is no overrun) close to the top dead point, and as shown in the drawing, top dead point stop confirmation signal $P_1$ has already been inputted into the other input terminal of the second self holding circuit 12 under the condition of logical value 1 and also under the condition that output $Q_2$ of the OR circuit 15 is logical value 1. Consequently, when the slide does not overrun, the second self holding circuit 12 is triggered by the generation of start button ON signal $S_s$, so that the logical value becomes 1, and a signal of operation permission is generated from the operation button. In this way, permission of the slide operation is given by the operation button. Output $Q_s$ of the second self holding circuit 12 is fed back to the trigger signal input side through the OR circuit 16, and then self-held.

The aforementioned output $Q_s$ is also inputted into the AND circuit 13. Top dead point stop signal $P_2$ inputted into the other input terminal of the AND circuit 13 has not been generated at this point of time, and it is in a condition of logical value 1. Therefore, the reset side input of the first self holding circuit 11 becomes logical value 1. When the operation button is turned on under the aforementioned condition in order to drive the slide, operation button ON signal T is generated by the operation button generation circuit 2 under the condition that the logical value is 1, and operation button ON signal T is inputted into the first self holding circuit 11 through the OR circuit 14, so that the first self holding circuit 11 is triggered, and output $Q_1$ of logical value 1 is generated. This output $Q_1$ is fed back through the OR circuit 14, and output $Q_1$ of the first self holding circuit is held until the top dead point stop signal $P_2$ is generated. That is, the obtained good result of monitoring overrun is held until the next inspection.

In the second self holding circuit 12, top dead point stop confirmation signal $P_1$ is extinguished at a crank angle of 15° after the top dead point, so that the logical value becomes 0. However, output $Q_1$ of the first self holding circuit 11 is generated at this point of time, so that output $Q_2$ of the OR circuit 15 is held as it is, and output $Q_s$ is also maintained. The aforementioned output $Q_1$ is reset and stopped when top dead point stop signal $P_2$ to stop the slide is generated at a crank angle of 300° (that is a reset operation according to the result of monitoring overrun). At this time, the slide is in a process of elevation and slide elevating process signal $P_3$ is logical value 1, so that output $Q_2$ of the OR circuit 15 is maintained, and output $Q_s$ of the second self holding circuit 12 is also maintained as it is. The aforementioned slide elevating process signal $P_3$ becomes logical value 0 at a crank angel of 350°. However, at this point of time, top dead point stop confirmation signal $P_1$ is generated again, so that output $Q_2$ of the OR circuit 15 is maintained. Therefore, when the slide does not overrun and stops in this range, output $Q_2$ of the first self holding circuit 11 is generated before top dead point stop confirmation signal $P_1$ is extinguished, and therefore output $Q_s$ of the second self holding circuit 12 is maintained as it is, and an operation permission signal of logical value 1 is generated. Accordingly, as long as the slide is not overrun, output $Q_s$ continuously outputs an operation permission signal of logical value 1.

When top dead point stop signal $P_2$ is generated, the slide is decelerated. In the case where the slide has not been stopped in a predetermined range (a range from crank angle 340° to 15°) and when it has overrun (the slide has been stopped at a crank angle exceeding 15°) due to the deterioration of the brake, all of top dead point stop signal $P_1$, the first self holding circuit output $Q_1$ and slide elevating process signal $P_3$ become a condition of logical value 0. Therefore, output $Q_2$ of the OR circuit 15, that is, the overrun monitoring signal becomes logical value 0, so that it is judged that the slide has overrun. Accordingly, output $Q_s$ of the second self holding circuit 12 becomes logical value 0, and the operation permission signal is extinguished. In this case, even when the operation button 3 is turned on, the first self holding circuit 11 is not triggered, and operation permission signal $Q_s$ from the second self holding circuit 12 is not generated until the operation start is commanded by the start button.

According to the overrun monitoring circuit 10 described above, as long as the brake is normal and the slide does not overrun, $Q_s=1$ is maintained, so that the operation permission signal is kept being generated. When the slide has overrun, it becomes to be $Q_s=0$. Even when the operation button is turned on after that, the operation permission signal is not generated, and it is judged that the press is in a dangerous condition due to the deterioration of the brake, and the press operation is stopped. The result of inspection of overrun is self-held in the form of output $Q_1$ of the first self holding circuit 11, and when a resetting operation is conducted by top dead point stop signal $P_2$, the overrun of the slide is monitored at each reciprocating motion of the slide.

In the case where a failure has occurred in the signal holding circuits 11, 12 in the aforementioned overrun monitoring circuit 10, output is not generated as explained in the circuit shown in FIG. 4 (logical value 0), so that the operation permission signal is extinguished and the slide operation is stopped. In the case where a failure has occurred in the start button signal generation circuit 1, start button ON signal $S_s$ is also set on the side of logical value 0, and the second self holding circuit 12 is not triggered, so that the operation permission signal is not outputted. Further, when a failure has occurred in the operation button signal generation circuit 2, the operation button ON signal becomes logical value 0, and the output of the first self holding circuit 11 is extinguished, and the operation permission signal generated by the second self holding circuit 12 is stopped. Consequently, the overrun monitoring circuit 10 does not generate an operation permission signal in the case of a failure, so that a fail-safe structure can be provided.

In this case, the role of the overrun monitoring circuit 10 is to check the brake performance at each period of the motion of the slide. Accordingly, in the case where overrun has been checked at a position close to the top dead point of the slide and good results have been provided, the stop operation of the slide is not disturbed in the following slide motion. Therefore, it is necessary to maintain the results of the check of overrun so as to generate a signal of operation permission. For example, in the case where the slide is started in a range where top dead point stop confirmation signal $P_1$ is generated and the slide is stopped at a position where the crank angel has passed through 15° for some reasons, it is impossible to restart the slide if the slide starting condition only depends on top dead point stop confirmation signal $P_1$. According to the aforementioned object of monitoring overrun, it is not necessary to make the start of the slide impossible as long as the brake is in a normal condition. Therefore, even after top dead point stop signal $P_1$ has become 0, the results of brake performance check must be maintained as an operation permission signal based on self holding function. Therefore, in this example, overrun monitoring signal $Q_2$ to be used until the brake performance is checked again, is made to be a logical sum of self holding output $Q_1$ that holds the inspection result at top dead point stop confirmation signal $P_1=1$ until the start of the next inspection, slide elevation process signal $Q_3$, and top dead point stop confirmation signal $P_1$.

Next, with reference to FIG. 9, the operation of the operation button OFF confirmation circuit 20 will be explained.

When the press is in a normal condition, output $Q_s$ of the overrun monitoring circuit 10 becomes logical value 1 as described before when the start button is turned on, and an operation permission signal is inputted into the AND circuit 22. Since restart prevention signal $P_4$ is generated between crank angle 240° and 270° (logical value 0) as shown in FIG. 9, it is inputted into the AND circuit 22 as logical value 1 when the press has been started. When the spring return force of the start button is normal and the start button is turned off, start button OFF signal $S_s'$ sent from the start button signal generation circuit 1 becomes logical value 1 and is inputted into the AND circuit 22, and then the output of the AND circuit 22 becomes logical value 1 and is inputted into the third self holding circuit 21. When the operation button 3 is turned off under the aforementioned condition, the operation button OFF signal of logical value 1 is inputted into one of the input terminals of the third self holding circuit 21 from the operation button signal generating circuit 2 through the OR circuit 23, and then triggered. Since OFF of the operation button has been confirmed as described above, output $Q_{0a}$ of the third self holding circuit 21 becomes logical value 1, so that an operation permission signal is generated. Different from the overrun monitoring circuit 10, output $Q_s$ of the overrun monitoring circuit 10 is used of the input condition of the start instead of top dead point stop confirmation signal $P_1$. The reason is that: after the operation has been started and the slide has passed through a position where the crank angle is 15°, the aforementioned top dead point stop confirmation signal $P_1$ is extinguished, so that $P_1$ becomes 0, that is, the start signal is extinguished.

Operation permission signal $Q_{0s}$ generated by operation button OFF confirmation is reset and becomes logical value 0 and disappears by the generation of restart prevention signal $P_4$ (logical value 0) after the slide has been lowered and elevated to position of crank angle 240°. After restart prevention signal $P_4$ has been extinguished at crank angle 270° (logical value 1), the operation button is turned off, and then the logical value becomes 1 again and an operation permission signal is generated in accordance with the confirmation of operation button OFF. Consequently, in the case where the operation button is not turned off after a reset operation has been once conducted in accordance with the generation of restart prevention signal $P_4$, the output of the third self holding circuit 21 does not become logical value 1, so that the operation permission signal is not generated by the operation OFF confirmation circuit 20, and the slide operation is prohibited.

According to the aforementioned operation button OFF confirmation circuit 20, the condition of operation button OFF is checked at each reciprocating motion of the slide. In this example, OFF of the start button is used as one of the conditions for generating an operation permission signal. The reason is as follows. In the case where an ON signal of the start button is used, it is impossible to distinguish a normal ON condition from an abnormal ON condition such as a failure of the button spring in which the start button can not be returned to OFF. In order to prevent the aforementioned problem, an operation permission signal is generated after the confirmation of a normal return operation of the start button conducted by the spring force. Therefore, a function to detect a failure of the start button is also provided. Further, since operation permission signal $Q_s$ of the overrun monitoring circuit 10 is used for a condition signal for the generation of an operation permission signal of the operation button OFF confirmation circuit 20, the logical product of an operation permission signal based on the overrun monitoring and an operation permission signal based on the operation button OFF confirmation can be made to be a final operation permission signal.

When the slide operation control device is provided with the overrun monitoring circuit 10 and the operation button OFF confirmation circuit 20, the circuit structure can be remarkably simplified as compared with an operation control device including a contact circuit composed of relays, and the fail-safe properties can be improved.

The example of the present invention is explained above referring to the attached drawings. However, the structure of the present invention is not limited to the specific example, and it should be understood that variations and modifications may be made therein within the scope of the appended claims.

As explained above, the slide operation control device according to the present invention can be structured more simply than the conventional one that is composed of a contact circuit including electromagnetic relays, so that the dimensions of the device can be reduced. The control device of the invention is superior to the conventional one from the viewpoint of fail-safe properties, so that the safety can be remarkably enhanced when operators are engaged in the dangerous work to operate a press.

INDUSTRIAL POSSIBILITY OF THE INVENTION

Industrial possibility of the present invention is high because the control device of the present invention can remarkably improve the safety of operators who are engaged in the dangerous manual press work.

We claim:

1. A slide operation control device for a press having a structure in which the slide is driven when an operation button is operated at each reciprocating motion of the slide, the control device comprising an overrun monitoring circuit that monitors whether or not the slide is stopped in a predetermined range close to a top dead point when the operation button is operated and generates an operation permission signal when the slide is stopped in the predetermined range, the control device also comprising an operation button OFF checking circuit that confirms whether or not the operation button is turned off when the slide is restarted and that generates an operation permission signal in the case where the operation button is turned off, wherein the slide can be driven downward when both the overrun monitoring circuit and the operation button OFF checking circuit generate the operation permission signal, the overrun monitoring circuit including a first self holding circuit and a second self holding circuit in which the output level is not mistaken for logical value 1 in the case of a failure when the output energy condition of the circuit is represented by the binary variables of 1 and 0 and also when a high energy condition is represented by logical value 1 and a low energy condition or a no energy condition is represented by logical value 0, wherein the first self holding circuit being structured in such a manner that: a signal representing that the operation button is turned on is used for a trigger signal, the operation button ON signal becoming logical value 1 when the operation button is turned on, the operation button ON signal being not mistaken for logical value 1 in the case of a failure; and an output of logical product of a slide stop command signal and an output signal of the second self holding circuit is used for a reset signal, the slide stop command signal which is a signal to stop the slide becoming logical value 0 in a predetermined position in the range of slide elevation, the slide stop command signal being not mistaken for logical value 1 in the case of a failure, further the second self holding circuit being structured in such a manner that: a start button ON signal is used for a trigger signal, the start button ON signal being a signal showing the start of the operation of the press, the output level of the start button ON signal becoming logical value 1 when the start button is turned on, the output level of the start button ON signal being not mistaken for logical value 1 in the case of a failure; and the logical sum of a top dead point stop confirmation signal, a slide elevating process signal and the output signal of the first self holding circuit is used for a reset signal, the top dead point stop confirmation signal being a signal showing that the slide is in a predetermined range close to the top dead point, the output level of the top dead point stop confirmation signal becoming logical value 1 when the slide is in a predetermined range close to the top dead point, the output level of the top dead point stop confirmation signal being not mistaken for logical value 1 in the case of a failure, the slide elevating process signal being a signal showing that the slide is in the process of elevation, the output level of the slide elevating process signal becoming logical value 1 in a range of slide elevation, the output level of the slide elevating process signal being not mistaken for logical value 1 in the case of a failure, further the output signal of the second self holding circuit being made to be an operation permission signal based on overrun monitoring, wherein the operation is permitted when the output level of the signal is logical value 1.

2. The slide operation control device for a press according to claim 1, wherein said first and second self holding circuits are composed in such a manner that: a rectified output of an AND circuit is fed back to the side of a trigger signal input terminal, wherein the AND circuit generates the output only when an input signal, the level of which is higher than that of the voltage of a power supply, is inputted into the 2 input terminals.

3. The slide operation control device for a press according to claim 2, wherein said AND circuit comprises: a first transistor, the collector being connected with one of the input terminals through a resistance, the emitter being connected with an power supply input terminal; a second transistor, the emitter being connected with the power supply input terminal, the collector being connected with the ground through two resistances connected in series, the base being inputted with a collector voltage of the first transistor that is divided by a dividing resistance provided between the collector of the first transistor and the ground; a third transistor, the base being inputted with the collector voltage of the second transistor divided by the two resistances connected in series, the collector being connected with one of said input terminal through the two resistances connected in series, the emitter being connected with the ground; a fourth transistor, the base being inputted through a resistance with an input terminal voltage divided by the two resistances connected with the collector of the third transistor, the collector being connected with one of the input terminals through a resistance, the emitter being connected with the input terminal of the power supply; a fifth transistor, the base being inputted with the collector voltage of the fourth transistor through a resistance, the collector being connected with the other input terminal through a resistance, the emitter being connected with the input terminal of the power supply; a sixth transistor, the emitter being connected with the input terminal of the power supply, the collector being connected with the ground through two resistances connected in series, the base being inputted with the collector voltage of the fifth transistor divided by the dividing resistance provided between the collector of the fifth transistor and the ground; and a seventh transistor, the base being inputted with the collector voltage of the sixth transistor divided by the two resistances connected in series, the collector being connected with the other input terminal through two resistances connected in series, the emitter being connected with the ground, wherein an input signal voltage is inputted into the base of the first transistor through a resistance, the input signal voltage being divided by the resistances provided in series and connected with the collector of the seventh transistor, the input signal voltage being impressed upon the other input terminal, and wherein the collector of the seventh transistor is connected with the output terminal.

4. A slide operation control device for a press having a structure in which the slide is driven when an operation button is operated at each reciprocating motion of the slide, the control device comprising an overrun monitoring circuit that monitors whether or not the slide is stopped in a predetermined range close to a top dead point when the operation button is operated and generates an operation permission signal when the slide is stopped in the predetermined range, the control device also comprising an operation button OFF checking circuit that confirms whether or not the operation button is turned off when the slide is restarted and that generates an operation permission signal in the case where the operation button is turned off, wherein the slide can be driven downward when both the overrun monitoring circuit and the operation button OFF checking circuit generate an operation permission signal, the operation button OFF confirmation circuit including a third self holding circuit in which the output level is not mistaken for logical value 1 in the case of a failure when the output energy condition of the circuit represented by the binary variables of 1 and 0, and when a high energy condition is logical value 1 and a low energy condition or a condition without energy is logical value 0, wherein the third self holding circuit is structured in such a manner that: an operation button OFF signal is used for the trigger signal, the operation button OFF signal being a signal showing that the operation button has been turned off, the operation button OFF signal becoming logical value 1 when the operation button has been turned off, the operation button OFF signal being not mistaken for logical value 1 in the case of a failure; and the output of logical product of an operation permission signal of the overrun monitoring circuit, a restart prevention signal and a start button OFF signal is used for the reset signal, the restart prevention signal being a signal for confirming OFF of the operation button, the output level of the restart prevention signal being logical value 0 at a predetermined position in a range of slide elevation, the output level of the restart prevention signal being not mistaken for logical value 1 in the case of a failure, the start button OFF signal being a signal showing that the start button to be operated in the start operation of the press is turned off, the output level of the start button OFF signal being logical value 1 when the start button has been turned off, the output level of the start button OFF signal being not mistaken for logical value 1 in the case of a failure, wherein the output signal of the third self holding circuit is made to be an operation permission signal based on the operation button OFF confirmation, and wherein the operation is permitted when the output level is logical value 1.

5. The slide operation control device for a press according to claim 4, wherein said third self holding circuit is composed in such a manner that: a rectified output of an AND circuit is fed back to the side of a trigger signal input terminal, wherein the AND circuit generates the output only when an input signal, the level of which is higher than that of the voltage of a power supply, is inputted into the 2 input terminals.

6. The slide operation control device for a press according to claim 5, wherein said AND circuit comprises: a first transistor, the collector being connected with one of the input terminals through a resistance, the emitter being connected with an power supply input terminal; a second transistor, the emitter being connected with the power supply input terminal, the collector being connected with the ground through two resistances connected in series, the base being inputted with a collector voltage of the first transistor that is divided by a dividing resistance provided between the collector of the first transistor and the ground; a third transistor, the base being inputted with the collector voltage of the second transistor divided by the two resistances connected in series, the collector being connected with one of said input terminals through the two resistances connected in series, the emitter being connected with the ground; a fourth transistor, the base being inputted through a resistance with an input terminal voltage divided by the two resistances connected with the collector of the third transistor, the collector being connected with one of the input terminals through a resistance, the emitter being connected with the input terminal of the power supply; a fifth transistor, the base being inputted with the collector voltage of the fourth transistor through a resistance, the collector being connected with the other input terminal through a resistance, the emitter being connected with the input terminal of the power supply; a sixth transistor, the emitter being connected with the input terminal of the power supply, the collector being connected with the ground through two resistances connected in series, the base being inputted with the collector voltage of the fifth transistor divided by the dividing resistance provided between the collector of the fifth transistor and the ground; and a seventh transistor, the base being inputted with the collector voltage of the sixth transistor divided by the two resistances connected in series, the collector being connected with the other input terminal through two resistances connected in series, the emitter being connected with the ground, wherein an input signal voltage is inputted into the base of the first transistor through a resistance, the input signal voltage being divided by the resistances provided in series and connected with the collector of the seventh transistor, the input signal voltage being impressed upon the other input terminal, and wherein the collector of the seventh transistor is connected with the output terminal.

7. A slide operation control device for a press having a structure in which the slide is driven when an operation button is operated at each reciprocating motion of the slide, the control device comprising an overrun monitoring circuit that monitors whether or not the slide is stopped in a predetermined range close to a top dead point when the operation button is operated and generates an operation permission signal when the slide is stopped in the predetermined range, the control device also comprising an operation button OFF checking circuit that confirms whether or not the operation button is turned off when the slide is restarted and that generates an operation permission signal in the case where the operation button is turned off, wherein the slide can be driven downward when both the overrun monitoring circuit and the operation button OFF checking circuit generate an operation permission signal, the overrun monitoring circuit including a first self holding circuit and a second self holding circuit in which the output level is not mistaken for logical value 1 in the case of a failure when the output energy condition of the circuit is represented by the binary variables of 1 and 0 and also when a high energy condition is represented by logical value 1 and a low energy condition or a no energy condition is represented by logical value 0, wherein the first self holding circuit being structured in such a manner that: a signal representing that the operation button is turned on is used for a trigger signal, the operation button ON signal becoming logical value 1 when the operation button is turned on, the operation button ON signal being not mistaken for logical value 1 in the case of a failure; and an output of logical product of a slide stop command signal and an output of logical product of a slide stop command signal and an output signal of the second self holding circuit is used for a reset signal, the slide stop command signal which is a signal to stop the slide becoming logical value 0 in a predetermined position in the range of slide elevation, the slide stop command signal being not mistaken for logical value 1 in the case of a failure, further the second self holding circuit being structured in such a manner that: a start button ON signal is used for a trigger signal, the start button ON signal being a signal showing the start of the operation of the press, the output level of the start button ON signal becoming logical value 1 when the start button is turned on, the output level of the start button ON signal being not mistaken for logical value 1 in the case of a failure; and the logical sum of a top dead point stop confirmation signal, a slide elevating process signal and the output signal of the first self holding circuit is used for a reset signal, the top dead point stop confirmation signal being a signal showing that the slide is in a predetermined range close to the top dead point, the output level of the top dead point stop confirmation signal becoming logical value 1 when the slide is in a predetermined range close to the top dead point, the output level of the top dead point stop confirmation signal being not mistaken for logical value 1 in the case of a failure, the slide elevating process signal being a signal showing that the slide is in the process of elevation, the output level of the slide elevating process signal becoming logical value 1 in a range of slide elevation, the output level of the slide elevating process signal being not mistaken for logical value 1 in the case of a failure, wherein the output of the second self holding circuit is used for an operation permission signal of the overrun monitoring circuit when the output level of the second self holding circuit is logical value 1, the operation button OFF confirmation circuit being provided with a third self holding circuit in which the output level is not mistaken for logical value 1 in the case of a failure, also the third self holding circuit being composed in such a manner that: an operation button OFF signal is used for a trigger signal, the operation button OFF signal being a signal showing that the operation button has been turned off, the operation button OFF signal being logical value 1 when the operation button has been turned off so that it can not be mistaken for logical value 1; and an output of logical product of the output signal of the second self holding circuit of the overrun monitoring circuit, the restart prevention signal and the start button OFF signal, is used for a reset signal, the restart prevention signal being a signal for confirming OFF of the operation button the output level of the restart prevention signal being logical value 0 at a predetermined position in an elevating range of the slide, the output level of the restart prevention signal being not mistaken for logical value 1 in the case of a failure, the start button OFF signal being a signal showing that the start button to be operated in the start of the press has been turned off, the output level of the start button OFF signal being logical value 1 when the start button has been turned off, the output level of the start button OFF signal being not mistaken for logical value 1 in the case of a failure, wherein the output of the third self holding circuit is used for an operation permission signal of the operation button OFF confirmation circuit when the output level of the third self holding circuit is logical value 1.

* * * * *